Patented June 2, 1936

2,042,709

UNITED STATES PATENT OFFICE 2,042,709

METHOD OF MAKING SODIUM CARBONATE SALTS

Hans Frasch, New York, N. Y.

No Drawing. Application October 1, 1932, Serial No. 635,874

2 Claims. (Cl. 23—63)

The object of this invention is to provide new and useful salts of sodium carbonates, and to regulate and control definite proportions of water which are assumed to be embodied in such salts by reaction to become and constitute a part of their chemical construction or in the form of water of crystallization.

By my process I may produce new salts of sodium carbonates containing but one molecular equivalent of water which it is believed constitutes a part of their chemical construction or which may contain, as water of crystallization any other definite proportion of water, with which sodium carbonate in itself or in combination with other salts is capable of combining, and I may produce a concentrated salt of sodium carbonate of commercial and industrial value which contains, as water of crystallization but one equivalent, or more, of water but less than the normal sal soda of commerce which contains five or ten equivalents of water.

By the same method, in addition to the sodium carbonate salt which contains one molecule of water which is thought to be present as water of construction, I may obtain a double salt of sodium monocarbonate and bicarbonate, embodying one equivalent of water, both of which salts are of industrial value for making caustic soda, as stated by me in a contemporaneous application for patent filed October 1, 1932, Serial No. 635,875.

To practice my invention I proceed as follows:

A vessel or apparatus constructed of suitable material and equipped with means for heating and for reflux condensation of aqueous vapor, is charged with a solution of sodium chloride, or salt brine previously freed from earthy alkalies, and with an amount of sodium bicarbonate such as can reasonably be taken care of, that is to say, in proportion to the quantity and to the concentration of the salt brine, and to suit the purpose of the final product. The higher the concentration of the salt brine in sodium chloride, the lower will be the proportion of water in the final product. By application of heat the sodium bicarbonate is then decomposed, the sodium chloride solution and sodium bicarbonate being kept at boiling temperature until any desired amount of the carbonic acid represented in the bicarbonate has been liberated and removed from the process.

Of course the boiling temperature referred to will be directly proportionate to the concentration of the sodium chloride solution including the contained sodium bicarbonate. It is essential, however, that the temperature be sufficient for decomposition of the sodium bicarbonate.

The carbonic acid and aqueous vapor evolved during the boiling process may be separated in the customary manner by reflux condensation, the water of condensation returning by gravity into the body of the salt brine within the converting vessel, and the carbonic acid which is separated during the process of condensation of the vapor being removed to be otherwise utilized as may be desired. The hot salt brine, with the resultant predetermined sodium carbonate salt in solution or in suspension, is then withdrawn from the apparatus and permitted or caused to cool. This sodium carbonate salt which contains the desired equivalent of water will then readily separate from the sodium chloride solution from which it may be removed by filtration or other suitable means.

After removal of the sodium carbonate salt, the salt brine, being then the mother liquor, may be returned to the converting apparatus to be used over and recharged with fresh quantities of sodium bicarbonate.

With the exception of the product which may be expressed by the formula $Na_2H_2OCO_3$ already referred to, and the product expressed substantially by the formula

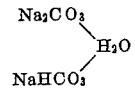

hereinafter referred to, which are novel and are believed to contain the water as water of construction, the other products obtained in accordance with the disclosure are well known.

To regulate the amounts of water to be embodied in the products (the sodium carbonate salts) produced in accordance with my invention, a concentrated solution of sodium chloride is maintained as a constant factor, and, as hereinbefore indicated, the concentration of this solution in sodium chloride will determine the amount of water represented in the product, the sodium bicarbonate to be converted being charged into such solution of sodium chloride. Where the salt represented substantially by the formula $Na_2H_2OCO_3$ is the product desired a sodium chloride solution saturated at the temperature necessary to decompose the sodium bicarbonate is used.

To produce sodium carbonate salts of the nature of $Na_2H_2OCO_3$, in which the water, by reaction, is believed to form and constitute a part of their chemical construction, as hereinbefore referred to, the sodium chloride solution may be saturated to a concentration of 30 to 40 per cent NaCl at a temperature of 108° C., and this saturated solution may also be used in obtaining a double salt of sodium monocarbonate and bicarbonate combined by one equivalent of water, as hereinafter referred to.

It will be understood that in producing the sodium carbonate salts in which the water is believed to be present as water of construction rather than as water of crystallization, although the heating by which the reaction is produced is sufficient for decomposition of the sodium bicarbonate, and although the carbon dioxide is liberated the saturated state of the sodium chloride solution will result in the water represented in the constituents of the sodium bicarbonate being caused to combine within the product as water of construction to produce my new salt as expressed by the formula $Na_2H_2OCO_3$, whereas, if the sodium chloride solution is below the saturation point salts of known character and containing water of crystallization will be produced, for example $Na_2CO_3.xH_2O$.

The final product of sodium carbonate contains one equivalent of water and is obtained from a saturated solution of sodium chloride, in the manner stated, substantially as expressed by the formula $Na_2H_2OCO_3$, it is in itself of commercial value as a concentrated soda salt. It is also of industrial value in the manufacture of caustic soda, as set forth by me in the contemporaneous application for patent hereinbefore referred to, by exposing the salt to a temperature of decomposition and thereby displacing the carbonic acid and forming caustic soda. When, during the operation of the process as stated, the conversion of the sodium bicarbonate to monocarbonate is adjusted to balance in chemical equivalent proportions the converted sodium monocarbonate and unconverted bicarbonate, a double salt of sodium monocarbonate and bicarbonate combined by one equivalent of water is obtained, which may be expressed by the formula

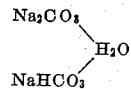

This may be accomplished by supplying sodium bicarbonate in excess of the amount necessary to produce my sodium carbonate salt containing only one equivalent of water; and this excess may be introduced into the process initially or it may be added after the completion of the formation of the sodium carbonate salt containing only one equivalent of water. This salt also when heated to a temperature of decomposition as stated by me in said contemporaneous application for patent, will result in caustic soda.

What I claim is:

1. A process of producing a sodium carbonate salt containing sodium carbonate and sodium bicarbonate combined by one equivalent of water, which comprises subjecting sodium bicarbonate to a temperature of decomposition within a saturated solution of sodium chloride until the sodium carbonate and sodium bicarbonate are in equimolecular proportion, and thereafter cooling and recovering the product thus formed.

2. A process of producing hydrated sodium carbonate salts of predetermined hydration, which comprises subjecting sodium bicarbonate to its temperature of decomposition in a solution of sodium chloride, and controlling the amount of water to be represented in the sodium carbonate salt product by regulation of the concentration of the sodium chloride solution at the temperature of decomposition of the sodium bicarbonate, whereby the higher such concentration the lower will be the amount of water represented in the product.

HANS FRASCH.